United States Patent [19]

Assaad et al.

[11] Patent Number: 5,010,938
[45] Date of Patent: Apr. 30, 1991

[54] TIRE INCORPORATING A BEAD RING COMPRISING ROUND WIRE DISPOSED IN THE SHAPE OF A PARALLELOGRAM

[75] Inventors: Mahmoud C. Assaad; Danny E. Harrison, both of Uniontown, Ohio

[73] Assignee: The Goodyear Tire & Rubber Company, Akron, Ohio

[21] Appl. No.: 501,446

[22] Filed: Mar. 30, 1990

[51] Int. Cl.⁵ .............................................. B60C 15/04
[52] U.S. Cl. .................................. 152/539; 152/540; 152/547; 245/1.5
[58] Field of Search ............... 152/539, 540, 541, 547; 245/1.5; 156/136

[56] References Cited

U.S. PATENT DOCUMENTS

| | | |
|---|---|---|
| 1,981,893 | 11/1934 | Abbott, Jr. ............... 152/540 |
| 2,291,659 | 8/1942 | Shook . |
| 2,292,980 | 8/1942 | White . |
| 2,713,382 | 7/1955 | Bosomworth . |
| 2,971,553 | 2/1961 | Woodall . |
| 3,115,179 | 12/1963 | Shepherd . |
| 3,245,454 | 4/1966 | Lewis . |
| 3,580,319 | 5/1971 | Baden et al. . |
| 3,612,137 | 10/1971 | Guyet . |
| 3,682,223 | 8/1972 | Simpson ................. 152/547 X |
| 3,861,442 | 1/1975 | Bertrand . |
| 3,949,800 | 4/1976 | Lejeune . |
| 4,166,492 | 9/1979 | Pfeiffer . |
| 4,216,814 | 8/1980 | Grosch . |
| 4,284,117 | 8/1981 | Poque et al. . |
| 4,290,471 | 9/1981 | Pfeiffer . |
| 4,319,622 | 3/1982 | Iuchi et al. . |
| 4,378,042 | 3/1983 | Inae et al. ............... 152/540 |
| 4,406,317 | 9/1983 | Merten . |
| 4,407,347 | 10/1983 | Mirtain . |
| 4,557,307 | 12/1985 | Philpott . |

FOREIGN PATENT DOCUMENTS

| | | |
|---|---|---|
| 0557915 | 6/1957 | Belgium ............... 152/540 |
| 0288986 | 11/1988 | European Pat. Off. . |
| 3936231 | 3/1990 | Fed. Rep. of Germany . |
| 7322602 | 6/1973 | France . |

Primary Examiner—John J. Gallagher
Assistant Examiner—Nancy T. Krawczyk
Attorney, Agent, or Firm—David E. Wheeler

[57] ABSTRACT

A tire bead ring comprising round wires laid down in a parallelogram shape having an acute angle of 75°-90° is provided. The bead ring of the invention, when employed in a tire at a lay angle of 5°-15°, provides a means for spreading out or dissipating twisting forces or torques encountered by the bead area of the tire to prevent separation of the bead from the rim during inflation and loss of air because of the flexing of the tire during running. Also, when the bead comprises multiple turns of a single round wire, a bead having reduced weight and good strength and uniformity may be provided.

3 Claims, 3 Drawing Sheets

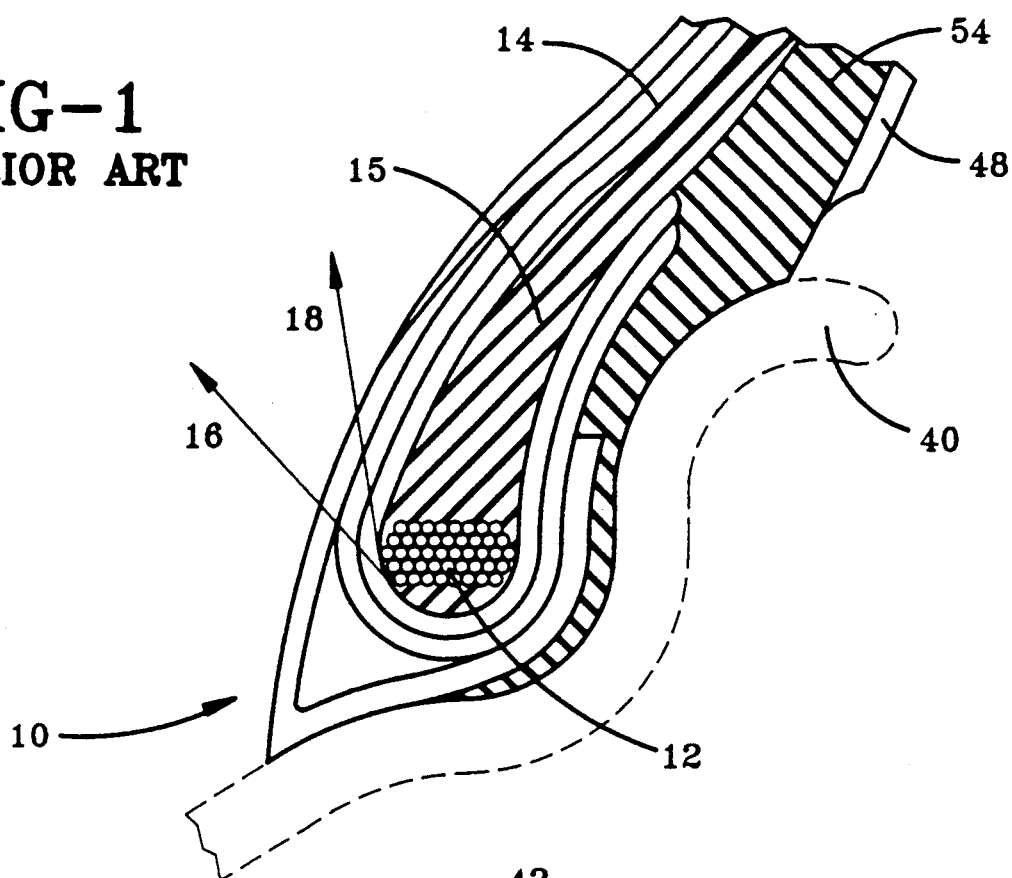
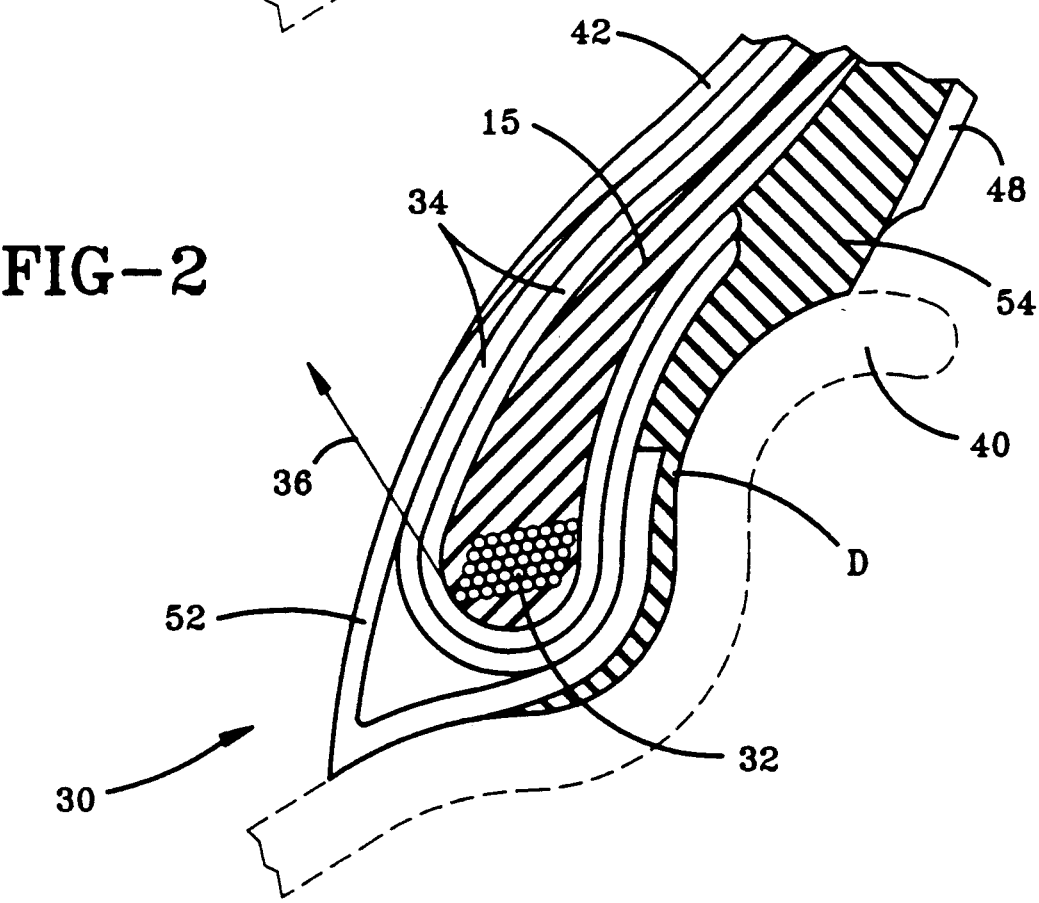

TIRE INCORPORATING A BEAD RING COMPRISING ROUND WIRE DISPOSED IN THE SHAPE OF A PARALLELOGRAM

BACKGROUND OF THE INVENTION

The invention relates to a tire bead ring made of round wire disposed in the shape of a parallelogram and a tire made incorporating such a bead.

In the tire art, many devices and tire modifications have been developed for the purpose of maintaining air pressure in an inflated pneumatic tire. The main non-catastrophic cause of air loss in a tire is an incomplete or intermittent seal between the tire bead and the rim. To insure a good seal between the tire bead and the rim, the prior art has used various toe guards, chafers, specially shaped rims, and other complex sealing devices comprising special materials in constructing a tire. It has been found that one of the reasons that it is difficult to maintain a good seal between the tire and the rim is that the bead has a tendency to move or rock (rotate off the rim) when the tire is inflated or when it is subjected to the dynamic stresses encountered during running.

It is believed that bead rocking also contributes to ply separation in the bead area, either because bead rocking causes stresses on the plies, or because the same stresses that cause bead rocking contribute to ply separation.

It has been proposed that by improving the torsional rigidity of the bead, that the bead rocking phenomenon can be reduced and substantially minimized. For this reason, the prior art has adopted the use of hexagonal beads. It is believed that the improved torsional rigidity of a hexagonal bead limits the rocking of the bead area of the tire when compared to a tire made using a round bead. Even so, using a prior art hexagonal bead ring as an example, when a carcass ply wraps around such a bead ring, it makes substantial contact with the bead at four of its six corners. Contact with two of the six corners (the two outside corners) provides the major lifting forces encountered by the bead area of the tire. The vectors of the forces acting at these two points act together to provide a twisting couple which tends to cause the bead area to rotate on the rim.

One method the prior art has used to prevent twisting couples from acting on a bead ring is to provide a square bead having a 0° lay angle, wherein major lifting forces are encountered only at one corner of the bead. Such a square bead is not suitable for all applications.

In some prior art applications, it has been suggested that flat wires may be used in bead rings to prevent deformation of the bead ring during vulcanization, which deformation results in different strands of bead wire being under different tensions. See, for example U.S. Pat. Nos. 3,949,800 and 4,290,471. It has been found, however, that it is difficult to obtain flat wires in a desired shape within tolerances (see the '471 patent, col. 1, lines 40–46) and accordingly, are sometimes difficult to manufacture as desired. Also, when flat wires are used and stacked, forces applied to one of the flat wires are translated to adjacent flat wires undiminished, and the entire bead ring is substantially affected by such forces.

The bead rocking or toe lifting phenomenon is related to bead twisting.

In accordance with the present invention, it has been theorized that if the bead rocking phenomenon is minimized, and if the twisting forces encountered by the bead can be minimized, that less stringent methods can be used to ensure that a seal is maintained between the tire bead and the rim, reducing the labor and consequently the expense of building a tire.

Also, it is expected that if twisting forces encountered by a tire bead are minimized, either as a result of reduced bead rocking or in a way that reduces bead rocking, the added stability of the bead will cause a reduction of ply separation at the ply ending in the bead area of the tire and reduce wear (such as chafing) and improve bead durability.

It is an object of the present invention to provide a tire bead ring which is easy to build and which dissipates twisting forces encountered by a tire bead and has a shape and disposition which is less susceptible to bead rocking and toe lifting because the torques encountered by the bead are minimized as compared to conventional hexagonal beads.

It is also an object of the invention to provide a tire incorporating the bead of the invention.

Other objects of the invention will be apparent from the following description and claims.

DEFINITIONS

As used herein, the following terms are defined as follows:

The "bead area" of a tire refers mainly to the bead ring and that portion of the carcass ply that wraps around the bead ring, but optionally may include the apex, chafer, flipper and toe guard.

"Apex" refers to rubber above the bead ring which fills the gap between the carcass ply and the folded over portion of the carcass ply.

The "bead ring" as used herein is a packaged bead comprising wire wound in adjoining parallel turns (loops) to form a plurality of superimposed layers.

"Equatorial plane" of the tire refers to the plane perpendicular to the tire's axis of rotation and passing through the center of its tread.

"Tire axis" refers to the line passing perpendicular through the center of the equatorial plane of the tire.

The "lay angle" is the angle between the side of the bead ring closest to horizontal and the tire axis.

"Locking phenomena" refers to dissipated motion due to friction between filaments of bead wire in a bead. For example, when stress is applied to a bead ring, the force encountered by the filament closest to the source of the stress is not transferred completely to the adjoining filament as the bead ring is compressed. The energy of the stress is absorbed in the compression of the bead ring. The bead ring moves only when the energy of the stress exceeds the energy of compression or the "locking" of the filaments of the bead ring.

The "outside" of a tire represents the surface or sidewall of the tire that faces the road as opposed to the under surface of the car (the letter or serial side).

"Crown area" refers to that portion of the tire within the width limits of the tire tread in the proximity of the tire tread.

SUMMARY OF THE INVENTION

A tire bead ring construction is provided comprising adjacent strands of round wire disposed in the shape of a parallelogram having an acute angle of 75°–90°. In a preferred embodiment, the strands of round wire comprise a single wire disposed in a plurality of adjacent loops. When used in a tire, the round shape of the wire dissipates twisting forces encountered by the bead, and the shape of the bead minimizes torque forces on the bead.

A pneumatic tire made using the bead of the invention is also provided. The tire comprises a bead area, the bead ring of the invention being disposed in the bead area, and a carcass reinforcement is wrapped around the bead ring. The bead ring is disposed in the tire having a lay angle of 5°-15°, with respect to the axis of the tire. The use of round wires in the bead ring makes it possible for the bead ring to absorb and dissipate twisting forces on the bead, and the shape of the bead ring and its angle of disposition in the tire substantially minimize torque forces applied to the bead.

BRIEF DESCRIPTION OF THE DRAWINGS

FIG. 1 illustrates a prior art hexagonal bead ring in the bead area of a tire.

FIG. 2 illustrates the bead ring of the invention in the bead area of a tire.

DETAILED DESCRIPTION OF THE INVENTION

Figure 1A:
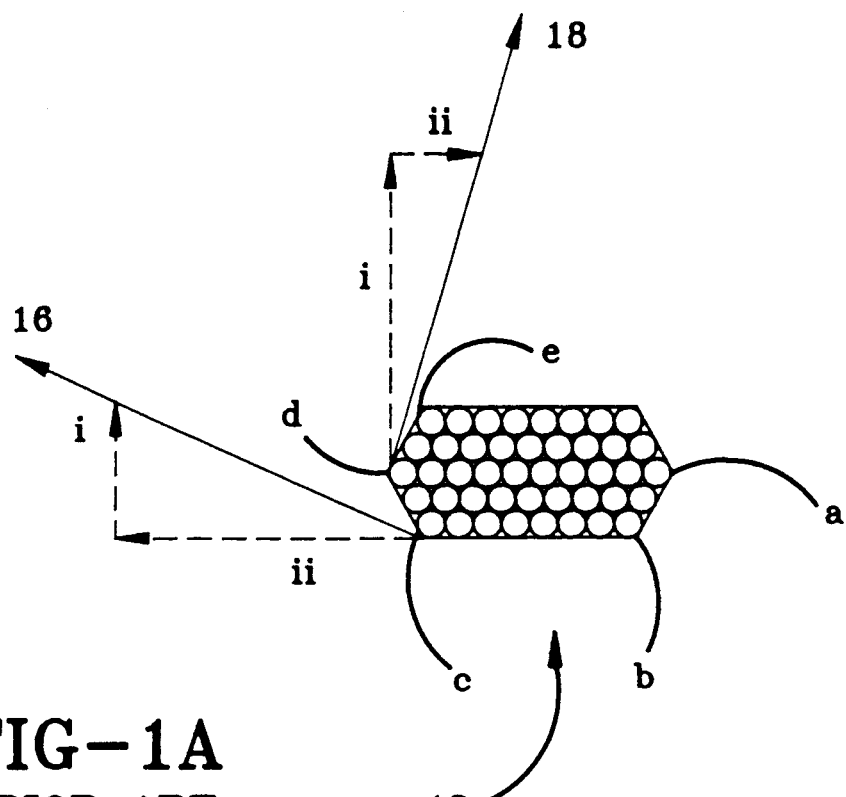
FIG. 1A is an enlarged illustration of a prior art hexagonal bead showing vector forces encountered by such a bead.

With reference now to FIGS. 1 and 1A, and as discussed in the Background of the Invention, a prior art hexagonal bead ring 12 is disposed in the bead area 10 of a tire construction and is wrapped by carcass ply(s) 14 of the tire. Carcass ply(s) 14 have substantial contact with bead ring 12 at points a, b, c, and d, and any motion or stress applied by carcass ply 14 (such as encountered in inflating the tire or in the flexing caused by the dynamic action of the tire during running) tends to transfer a torque or twisting couple to the bead ring from the carcass ply as illustrated by (for example) vector arrows 16 and 18. Vector arrows 16 and 18 can be separated into vertical components i and horizontal components ii. Vertical components i tend to lift the bead area 10 of the tire. Similarly, horizontal vector ii tends to cause bead area 10 to slide off rim 20. As can be seen in FIG. 1, the horizontal components of the vectors 16 and 18 tend somewhat to cancel each other, whereas the vertical components of the vector are additive, causing a substantial lifting force on the bead area of the tire.

Because of the relationship of the sidewall of a tire to a bead ring, and the relationship of the bead area of the tire to the rim, stresses encountered by some areas of the bead ring have greater impact on the movement of the bead ring than others. For example, referring to FIG. 1A, point a is substantially in line with carcass ply 14 and has substantially direct contact with rim 20. Forces encountered at point a are substantially direct forces and because point a is tight to the rim, there is no torque or moment (i.e. force x distance where distance approximates zero) acting at point a. The forces at point a provide minor vector forces contributing to the movement of the bead relative to the rim. By contrast, points c and d are affected by the wrap of carcass ply 14 and are remote from the tire/rim contact area, and accordingly, forces exerted at these points have a substantial torque or moment (i.e. force x distance where distance is substantial). Points c and d provide major vector forces contributing to the movement of the bead relative to the rim.

Figure 2A:
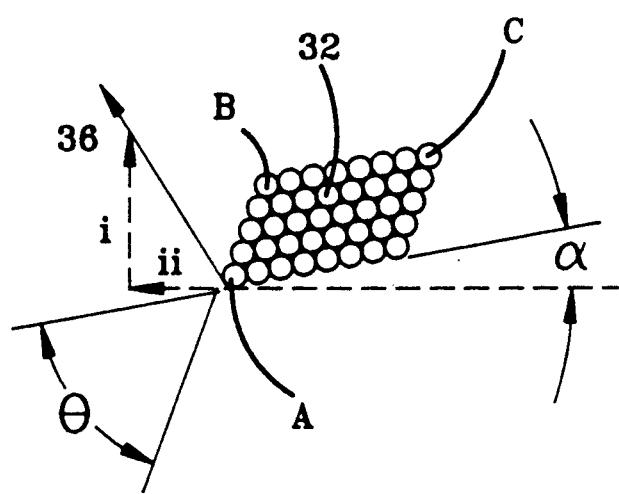
FIG. 2A is an enlarged illustration of the bead of the invention showing its angles of disposition and vector forces acting on the bead.

With reference now to FIGS. 2 and 2A, and in accordance with the present invention, it has been found that the lifting forces encountered in the bead area of a tire may be substantially reduced by providing a bead ring 32 having a cross section shape in the form of a parallelogram having a substantially acute angle $\theta$ of about 70°-90°, preferably 75°-85°, and disposing said bead ring 32 in tire bead area 30 of a tire at a lay angle $\alpha$ of about 0°-15°, preferably 5°-15°, with respect to the axis of the tire. It has been found that particularly good results are obtained when a lay angle of 10° is used. The disposition and parallelogram shape of bead ring 32 maximizes the effect of contact between the bead ring 32 and the carcass ply(s) 34 at point A (the outside acute angle of the parallelogram) and minimizes the effect of carcass ply 34 at point B (the outside obtuse angle of the parallelogram) because of, respectively tighter (at A) and less tight (at B) contact between the carcass ply(s) and the points (corners) of the bead.

Accordingly, the torque or twisting couples encountered by the bead at point B are minimized and the major substantially direct contact between the carcass ply(s) and the bead occurs at point A, thereby providing only one major vector 36 contributing to bead lift.

In its preferred embodiment, the wire used for making the bead ring will be coated with 0.005 to 0.015 inch green rubber, preferably 0.01 inch, prior to its disposition in the bead ring. When the bead ring is assembled and the tire construction in which it is used is cured, the rubber used for coating the wire forms a matrix which separates the wires of the bead ring from each other, allowing the wires to react independently to stress, while maintaining their collective strengths in the bead ring.

In a preferred embodiment, the rubber which is used to coat the wires and form the rubber matrix in which the wires of the bead are embedded, will be harder than the rubber used in apex 15 of the tire. This provides integrity to the bead and helps assure that the apex 15, when the tire flexes, will move independently of bead ring 32. The rubber matrix is sufficiently flexible, however, to permit independent movement of the individual strands of wire in the bead ring in response to stresses encountered by bead ring 32.

It is also preferred that the adjacent strands of round wire used to make the bead of the invention comprise a single wire disposed in a plurality of adjacent loops.

Other means for providing a rubber matrix in a bead ring will be apparent to those skilled in the art.

The rubber used in the bead matrix preferably has a Shore A hardness of about 75-85, preferably about 80, and the rubber used in the apex has a Shore A hardness of about 60-70, preferably about 65. Natural rubber may be used in both the apex and the bead matrix: however, a higher loading of carbon black gives the matrix rubber its added hardness.

The parallelogram shape of the disposition of the wire inherently ensures that the rows of wires will be somewhat offset from one another because of the angled sides of the parallelogram. (When the parallelogram is 90°, it is preferred that the wires be nested.) This offset, which places the wires from one row in the spaces between the wires in the next row, permits a substantial amount of the stresses applied to the bead ring by the movement of the carcass plies to be absorbed by the rubber matrix surrounding the wire and ensures minimal translation of stress from one wire to the next.

In a preferred embodiment, the wire used to form bead 32 will have a circular cross section (round). Round wire is preferred since round wire is capable of movement (twisting) without translating that movement undiminished to an adjacent round wire. This property is described by the St. Venant Principle as described by Chajes in "Principles of Structural Stability Theory," Prentice Hall (1974).

Summarizing, the parallelogram cross section shape of bead ring 32 causes stresses encountered by bead ring 32 to be concentrated substantially at point A in a vector 36 which is substantially tangential to carcass ply 34 at its point of contact with bead ring 32. The effect of vector 36 on bead ring 32 is minimized by the fact that bead ring 32 is disposed in bead area 30 at lay angle $\alpha$, which means that the vertical forces encountered in bead area 30 are determined by the formula, $F(vert.) = F(tot.) \cos \alpha$ where F is force. The effect of vector 36 on bead ring 32 is minimized further by the fact that round wire is used in the construction of bead ring 32 and said round wire is embedded in a rubber matrix. Accordingly, each strand of round wire absorbs a portion of the twisting forces encountered by bead ring 32. The overall effect of these factors is that normal forces encountered by the wire strands at point C in the bead ring 32 are significantly diminished and may be substantially eliminated.

Accordingly, bead area 30 at its contact point D with rim 40 is substantially stabilized.

It is believed that stabilizing the bead reduces bead chafing and increases bead area durability by reducing the chances of ply separation.

Figure 3:
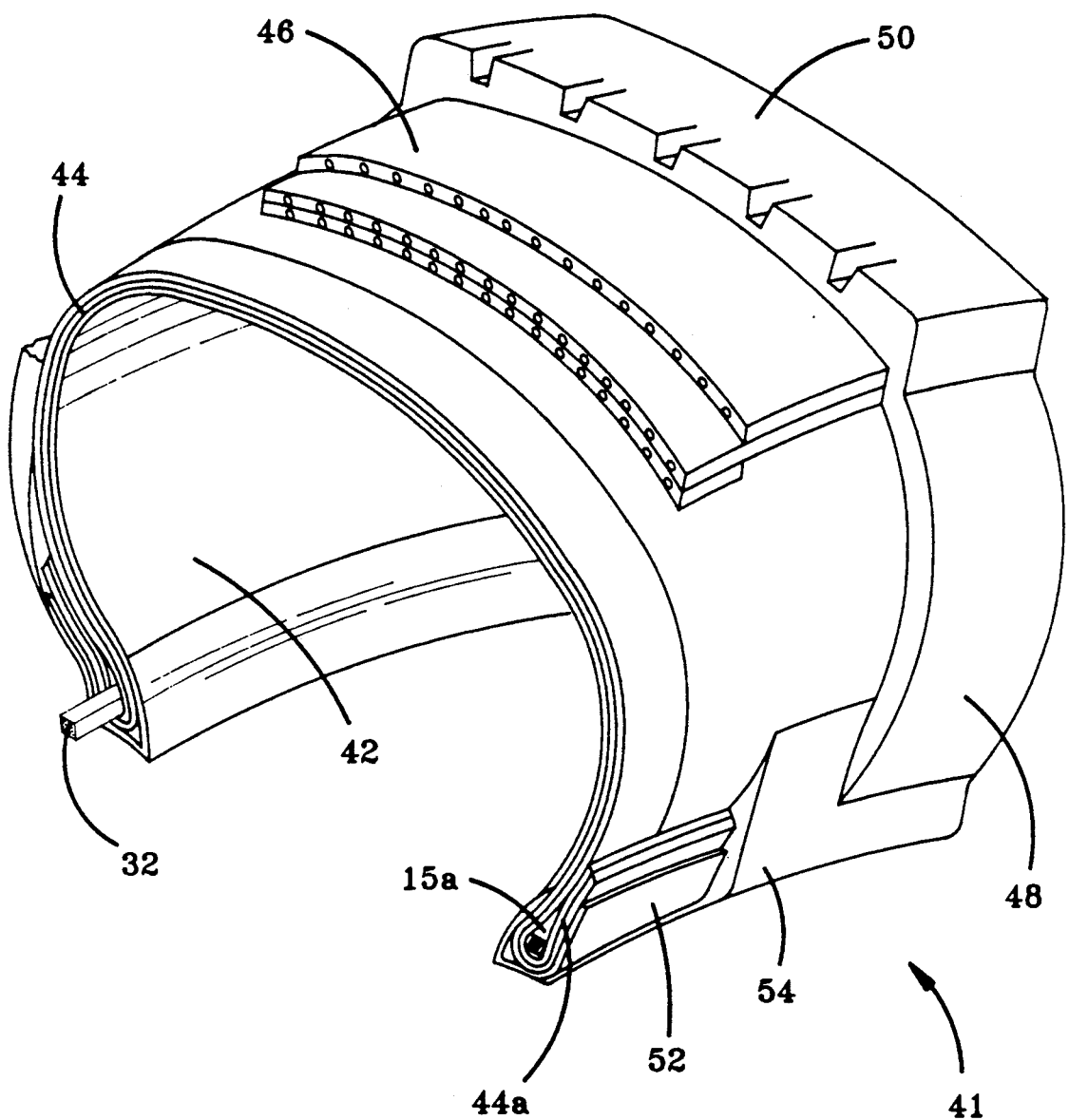
FIG. 3 illustrates a tire made using the bead ring of the invention.

With reference now to FIG. 3, a pneumatic tire 41 made incorporating the bead ring 32 of the invention is illustrated. The tire is made as is conventional in the tire building art and includes at least a pair of bead rings 32, carcass plies 44 which are wrapped around the bead rings 32, optional toe guards 52 and chafers 54 around bead rings 32 and over carcass plies 44, an optional inner liner 42 disposed inwardly of said carcass plies, optional belts or breakers 46 disposed over carcass plies 44 in a crown area of the tire, tread 50 disposed in the crown area of the tire, and sidewalls 48 disposed between tread 50 and bead rings 32. A bead area of said tire comprises bead ring 32, that portion 44a of carcass plies 44 which wrap over bead ring 32, and apex 15a which represents a substantially triangular area between carcass ply 44 and its turnup portion 44a and bead ring 32.

The invention is further illustrated with reference to the following Example.

EXAMPLE 1

Three 295/75R225 low profile tires were made having identical construction except for the bead structure. The control tire was made using a conventional hex bead having 75 turns of 0.050 inch diameter bead wire. Tire No. 2 was made using a stacked square bead comprising 78 turns of 0.050 wire and tire No. 3 was made using a nested square bead (the wires of the bead in each row were offset from the wires in the adjacent row) comprising 78 turns of 0.050 wire. The square beads had a lay angle in the tire of 15°. Two tires were made of each construction.

In a burst test, the following results were obtained:

|  | Pressure at Burst (psi) |  |
|---|---|---|
| Control | 445 | Burst at Bead |
| Tire No. 1 | 464 |  |
| Tire No. 2 | 472 |  |

In the burst test, a tire is mounted on a special rim and is filled with water to its rated pressure. If the tire survives, the tire is then hydrostatically inflated to its expected burst pressure. If the tire still survives, it is further inflated until it bursts, and the water pressure at burst is measured.

It was calculated, compensating for the three extra turns of wire in the square beads that the tires made using the square beads have about 2% greater burst strength than tires made using hexagonal beads. Although the number of tires sampled is small, this example seems to indicate that square beads have better stability than conventional hexagonal beads.

While specific embodiments of this invention have been illustrated and described, it will be apparent to those skilled in the art that the invention may be variously modified and practiced without departing from the spirit of the invention. The invention is limited only by the following claims.

What is claimed is:

1. A pneumatic tire comprising a bead area, said bead area comprising an apex, a bead ring, and a reinforced carcass ply wrapped around said bead ring, said bead ring comprising metal wire having a circular cross section, said wire forming multiple adjoining annular turns wherein said turns of wire are disposed in the cross section shape of a parallelogram having an acute angle of 75°-85°, each turn of wire in said bead ring is coated with a layer of about 0.005 to 0.015 inch green rubber whereby said green rubber provides a rubber matrix in which bead wires are contained when the green rubber is cured, and substantially maintains the relative position of wires in said bead, and wherein rubber in said matrix is harder than rubber used in said apex.

2. The pneumatic tire of claim 1 wherein said bead is disposed in said tire having an angle of 5°-15° with respect to the axis of said tire.

3. A pneumatic tire comprising a substantially parallel pair of bead rings, a toroidally disposed carcass ply wrapped over said bead rings, optional annular belts or breakers disposed over said carcass plies in a crown area of said tire, tread rubber disposed over said carcass plies and said optional belts or breakers in said crown area, and sidewalls disposed between said tread rubber and said bead rings, said bead rings being a part of a bead area of said tire, said bead area comprising:

a bead ring, a portion of said carcass ply wrapped around said bead ring, defined by an area in the direction of said sidewall between said bead ring and the portion of said carcass plies which wrap around said bead and an apex: said bead ring comprising a single metal wire having a circular cross section, said wire forming multiple adjoining annular turns wherein said turns of wire are disposed in a cross section shape of a parallelogram having an acute angle of about 75°-90°, each turn of said wire being coated with about 0.005 to 0.015 inch rubber wherein said rubber provides a matrix in which said turns of wire are maintained in a stable position relative to one another, and wherein rubber in said matrix is harder than rubber used in said apex, and wherein said bead is disposed in said tire having a lay angle of 5°–15° with respect to an axis of said tire, whereby said parallelogram shape of said bead, its lay angle, and round wires in a rubber matrix in said bead together absorb and dissipate twisting forces encountered by said bead and substantially prevent bead rocking when said tire is inflated on a rim and when said tire is flexed.

* * * * *